May 6, 1941. C. A. MARIEN 2,240,624
PISTON RING
Filed July 11, 1938
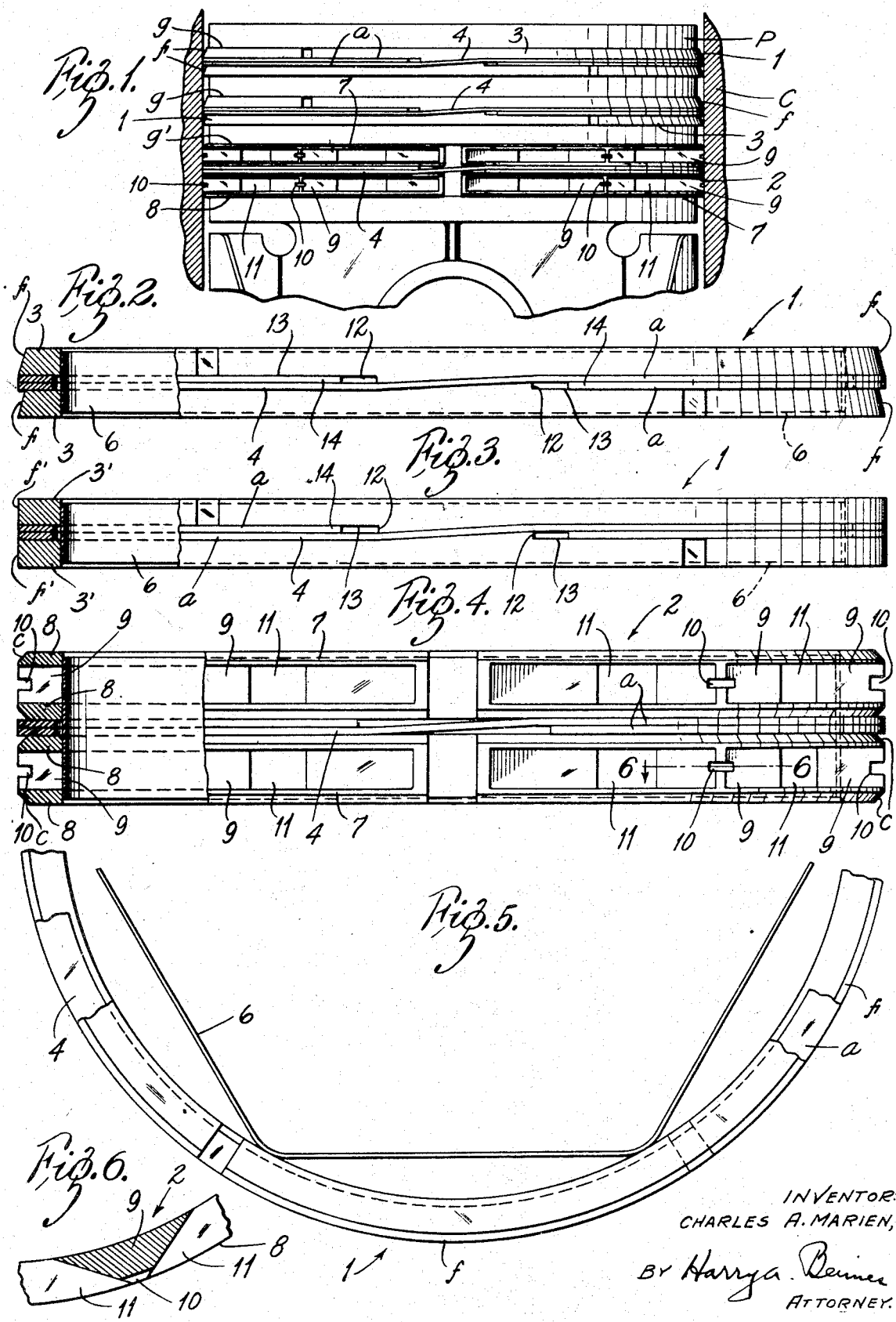
INVENTOR:
CHARLES A. MARIEN,
BY Harry A. Beimer
ATTORNEY.

Patented May 6, 1941

2,240,624

UNITED STATES PATENT OFFICE 2,240,624

PISTON RING

Charles A. Marien, St. Louis, Mo., assignor to Ramsey Accessories Manufacturing Corporation, St. Louis, Mo., a corporation of Missouri Application July 11, 1938, Serial No. 218,517

4 Claims. (Cl. 309—45)

My invention has relation to improvements in piston rings and it consists in the novel features of construction more fully set forth in the specification and pointed out in the claims.

While the present invention is primarily adapted for use with pistons within internal combustion engines, it is equally applicable in many instances to other types of engines and compressors, especially engines operating at very high compressions, such as Diesels.

The primary object of the invention is to devise a piston packing ring that will hold compression in the cylinder and at the same time control the flow of oil over the cylinder wall without an excessive amount of friction such as will produce scoring of the cylinder wall. It is the purpose of the present invention to satisfy all the requirements of a piston ring in an engine operating under high compressions and at high speeds. Obviously, the ring must also be serviceable at lower compressions and lower speeds as well. In other words, it must be efficient throughout the entire range of performance of the engine in which it is installed.

I have evolved such a ring by combining in various ways a thin steel helical ring with a cast iron ring, either of the compression or oil type, and have accomplished results heretofore incapable of accomplishment.

The subject-matter of the present invention is a continuation in part of that of my Patent No. 2,128,372, dated August 30, 1938, and has in common with that patent the combination of a two-coil spiral steel ring combination with a cast iron ring element.

I am fully aware that both the thin steel element and the spiral element are old in the art, the former being shown in Patent No. 2,091,947, and the latter in Patent No. 1,165,084. However, instead of a ring of dished shape I employ a perfectly flat helix, as I have discovered that in practice the outer edges of the dished ring cause excessive wear on the groove in which the ring is lodged, ultimately destroying the shape of the groove with deleterious effects. The same objection applies to a helical ring which exerts lateral pressure against the sides of the ring groove due to its expansive effect therein. In my improved ring the assembly of the respective components rests loosely (without excessive play) in the piston ring groove so that all contacting surfaces will have an oil film between them to allow for free movement of the respective elements without wear on the contacting surfaces.

These features, as well as other advantages possessed by the invention, will be better apparent from a detailed description of the invention in connection with the accompanying drawing, in which:

Figure 1 is a side elevation of the upper part of a piston equipped with two different forms of my improved piston ring; Fig. 2 is a combined side elevation and cross-section of my invention embodied in a compression-type piston ring with beveled cylinder contacting surfaces on the outer cast iron ring components; Fig. 3 is a combined side elevation and cross-section of a modified form of ring combination differing from that shown in Fig. 2 in that the cylinder contacting surfaces are not beveled; Fig. 4 is a combined side elevation and cross-section of the invention embodied in an oil type piston ring; Fig. 5 is a plan view of the segment of the ring shown in Fig. 2; and Fig. 6 is a cross-sectional detail on the line 6—6 of Fig. 4.

Referring to the drawing, P represents a piston operable within a cylinder C. The piston has a series of ring grooves $g$, $g$, $g'$ in which are disposed, respectively, compression rings 1, 1, made according to my invention, and an oil ring 2 embodying the principles of the present invention. The compression ring 1 (illustrated on an enlarged scale in Fig. 2) is a compound ring consisting of two plain cast iron tapered face ring elements 3, 3 and a steel element 4 coiled in the shape of a helix and nested between the elements 3, 3.

In the present instance two flat coils $a$, $a$ which are comparatively thin (about $\frac{1}{32}''$) comprise the ring element 4 which is assembled in the groove $g$ with the ring elements 3, 3, with lateral play or clearance so that the respective ring elements may expand and contract freely as they pass over the cylinder wall during the operation of the piston. The compound ring made up of the elements 3, 3 and 4 has a spring ring or expander 6 associated with it and initially in contact with the elements 3, 3, for the purpose of augmenting the tension of said elements to increase the unit pressure on the tapered faces $f$, $f$ against the cylinder wall.

The engagement of the spring expander 6 with the cast iron elements 3, 3, as above described, is the preferred form of the invention, although it may be desirable in some cases to have the spring expander 6 contact initially with the steel helical element 4, as well as with the cast iron elements 3, 3. However, in no case should the spring expander contact only with the intermediate helical element as this would tend to unbalance the ring and reduce the efficiency thereof.

In the modification shown in Fig. 3 the cylinder contacting faces f', f' of the cast iron ring elements 3', 3' are square so as to bear flat against the cylinder wall instead of being tapered as shown in Fig. 2; otherwise the constructions of Figures 2 and 3 are the same.

In the oil type ring shown in Fig. 4 the cast iron ring elements 7, 7 are similar in construction to the cast iron element of my co-pending application aforesaid in that it has cylinder contacting components 8, 8 maintained in fixed spaced relation by triangular shaped pillars 9, across the apex of each of which is a kerf 10 to enable the oil to flow readily from one oil passage 11 to that next adjacent.

However, the cast iron ring element 7, in the present instance, has the outer edges of the cylinder contacting components 8, 8 chamfered as shown at c, c, which reduces the area of the surface initially in contact with the cylinder wall and thereby increases the unit pressure. At the same time, the lower chamfer c greatly facilitates the operation of inserting the piston into the cylinder. Without the chamfer c, the sharp edge presented is often injured by contact with the cylinder as the ring and piston are inserted into the cylinder.

It will be observed that in Figures 2 and 3 offsets 12, 12 are formed in the opposing side faces 13, 13 of the rings 3, 3 to permit the end portions 14, 14 of the helical element to lie in intimate contact with the outer plain ring elements 3, 3.

In all the forms of the invention herein illustrated and described, it will be observed that the helical ring is composed of two thin steel coils; whereas, in my pending application, Serial No. 167,680, the thin steel ring is made up of a single coil. The advantage of the two-coil helical construction is that it possesses greater inherent tension so that at very high engine speeds, it responds instantly to the irregularities in the cylinder and remains in intimate contact with the cylinder wall at all times. When this helical ring is combined with a cast iron ring, as illustrated, a compound ring is produced that is effective in holding compression and in controlling the oil flow within the cylinder over the entire range of engine speeds that the modern automobile engine is capable of and under the high compression ratios at which such engines operate.

The advantage of a helical ring over a plain flat ring as shown in my application Serial No. 167,680 is that it is possible to use a helical ring of greater diameter than the diameter of the cylinder. In installing such ring the ring winds in the manner of a watch spring so that its diameter may be reduced sufficiently for installation in the cylinder, after which it expands against the cylinder wall with sufficient pressure to fit the wall closely at all points. In using a steel ring composed of a single loop the shape thereof, although circular before contraction, is distorted to an oval shape when contracted for subsequent expansion against the cylinder wall, while the helical ring maintains its circular shape and also is capable of conforming to the shape of out-of-round cylinders.

In my improved combination ring the full advantages of the helical ring are obtained on account of the freedom of movement said ring has within the groove as heretofore pointed out. Helical rings used alone, as disclosed in the prior art, are ineffective for holding compression because of the gap in the helix which permits "blow-by." However, when the helical ring is combined with the plain cast iron ring or an oil-type ring, the path for the "blow-by" is shut off and the full efficiency of the helical ring is realized. In order to obtain these results the helical ring must be flat so as to lie squarely against the cast iron ring and without impingement on the side walls of the piston ring groove—in other words, the entire ring combination must be free to float with the oil film serving as the medium and at the same time assisting in holding compression.

A recapitulation of some of the advantages of my improved ring will show the following:

1. The ring conforms to out-of-round cylinders to lie in intimate contact with the cylinder wall throughout the entire circumference thereof.
2. The ring is capable of efficient performance over a limited range of cylinder sizes since it is capable of expanding to a diameter considerably beyond that of the cylinder. In short, my improved ring fits over-sized cylinders.
3. My improved ring is capable of controlling oil at high piston speeds.
4. It prevents "blow-by."
5. These advantages become cumulative when a compression-type of cast iron ring is combined with the helical ring for one groove of the piston and combined with an oil-type cast iron ring for a lower groove of the piston. As illustrated in the drawing, most advantageous results are obtained in this combination when the helical ring is disposed above the compression-type ring and below the oil-type ring.

Having described my invention, I claim:

1. A three part piston ring comprising a pair of cast iron split rings and a thin steel ring therebetween, said cast iron rings having spaced circumferentially extending rails approximately the width of the steel ring, and the edges of the rails adjacent to the intermediate steel ring being beveled.

2. A three part piston ring comprising a pair of cast iron split rings and a thin steel ring therebetween, said cast iron rings having spaced circumferentially extending rails, and oil passageways between said rails, and the edges of the rails adjacent to the intermediate steel ring being beveled, whereby circumferentially extending oil recesses are provided between the steel ring and the cast iron rings.

3. A three part piston ring comprising a pair of cast iron split rings and a thin steel ring therebetween, said cast iron rings having spaced circumferentially extending rails, and the cast iron rings being undercut to provide circumferential recesses adjacent to the intermediate steel ring.

4. A three part piston ring comprising a pair of cast iron split rings and a thin steel ring therebetween, said cast iron rings having spaced circumferentially extending rails to provide oil passageways therebetween, the width of said oil passageways being greater than that of the rails, and the edges of the rails adjacent to the intermediate steel ring being beveled to provide knife-edge cylinder contacting surfaces.

CHARLES A. MARIEN.